(12) United States Patent
Jayanarayana et al.

(10) Patent No.: US 9,531,634 B2
(45) Date of Patent: *Dec. 27, 2016

(54) DATA TRAFFIC SWITCHING AMONG COMPUTING DEVICES IN STORAGE AREA NETWORK (SAN) ENVIRONMENTS

(71) Applicant: International Business Machines Corporation, Armonk, NY (US)

(72) Inventors: Sriharsha Jayanarayana, Bangalore (IN); Deepak Kumar, Santa Clara, CA (US); Sudheer R. Yelanduru, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 280 days.

This patent is subject to a terminal disclaimer.

(21) Appl. No.: 14/076,305

(22) Filed: Nov. 11, 2013

(65) Prior Publication Data
US 2015/0134766 A1    May 14, 2015

(51) Int. Cl.
| | |
|---|---|
| *G06F 15/16* | (2006.01) |
| *H04L 12/815* | (2013.01) |
| *G06F 15/173* | (2006.01) |
| *H04L 29/08* | (2006.01) |
| *G06F 17/30* | (2006.01) |
| *G06F 12/00* | (2006.01) |

(52) U.S. Cl.
CPC ......... *H04L 47/22* (2013.01); *G06F 15/17331* (2013.01); *G06F 17/30* (2013.01); *H04L 29/08072* (2013.01); *H04L 67/1097* (2013.01)

(58) Field of Classification Search
CPC ....... H04L 49/357; G06F 9/5077; G06F 3/067
USPC .......................... 709/203, 213, 223–229, 250
See application file for complete search history.

(56) References Cited

U.S. PATENT DOCUMENTS

| | | | |
|---|---|---|---|
| 7,525,957 B2 | 4/2009 | Scherer et al. | |
| 8,135,858 B2 | 3/2012 | Shanbhag et al. | |
| 8,228,820 B2 | 7/2012 | Gopal Gowda et al. | |
| 8,351,448 B1 | 1/2013 | McGlaughlin | |
| 2006/0034302 A1* | 2/2006 | Peterson | H04L 45/04 370/401 |

(Continued)

OTHER PUBLICATIONS

"Configuring N-Port Virtualization", Cisco Nexus 5000 Series NX-OS Software Configuration Guide; found at <http://www.cisco.com/en/US/docs/switches/datacenter/nexus5000/sw/configuring_n-port_virtualization>, accessed Jul. 3, 2013; 7 pages.

(Continued)

*Primary Examiner* — Zarni Maung
(74) *Attorney, Agent, or Firm* — Olive Law Group, PLLC (57) ABSTRACT

Data traffic switching among computing device in a SAN environment is disclosed herein. According to an aspect, a method may be implemented at an NPV device that is associated with multiple computing devices positioned behind the NPV device in a SAN. The method may also include receiving zoning information associated with the computing devices. The method may also include determining, based on the zoning information a map for switching data traffic among the computing devices. Further, the method may include switching the data traffic among the computing devices based on the determined map.

10 Claims, 5 Drawing Sheets

(56) References Cited

U.S. PATENT DOCUMENTS

| | | | |
|---|---|---|---|
| 2007/0201356 A1* | 8/2007 | Liao | H04L 29/06 370/221 |
| 2011/0022693 A1* | 1/2011 | Cheethirala | H04L 49/357 709/222 |
| 2011/0228670 A1 | 9/2011 | Sasso et al. | |
| 2012/0233491 A1* | 9/2012 | Chen | H04L 49/357 714/3 |
| 2013/0272302 A1* | 10/2013 | Hathorn | H04L 45/021 370/389 |
| 2015/0358241 A1* | 12/2015 | Jayanarayana | G06F 15/17331 709/219 |

OTHER PUBLICATIONS

"Designing and Deploying a Cisco Unified Computing System SAN Using Cisco MDS 9000 Family Switches", Cisco Deployment Guide, copyright 2010; Cisco Systems, Inc., 24 pages.
"N-Port Virtualization in the Data Center", Cisco White Paper, copyright 1992-2008, Cisco Systems, Inc., 7 pages.
"Storage Area Network: Secure SAN Zoning Best Practices", Brocade Communications Systems, Inc., white paper, no dates provided in article.

* cited by examiner

DATA TRAFFIC SWITCHING AMONG COMPUTING DEVICES IN STORAGE AREA NETWORK (SAN) ENVIRONMENTS

TECHNICAL FIELD

The present invention relates to SAN environments, and more specifically, to data traffic switching among computing devices in SAN environments.

BACKGROUND

A SAN is a dedicated network that provides access to data storage. SANs are typically used to make storage devices, such as disk arrays, accessible to servers so that the devices appear as locally attached devices to the operating system. SANs often utilize a fibre channel fabric topology, an infrastructure specially designed to handle storage communications. A typical fibre channel SAN fabric is made up of a number of fibre channel switches.

One difficulty in working with SANs is that a SAN switch developed by one manufacturer may not easily inter-operate with a SAN switch of another manufacturer. The lack of inter-operability can limit options in designing SANs, in particular, at the edge of a SAN. One technique for enabling interoperability between an edge switch of one vendor and a core switch of another vendor involves utilizing an N-port virtualizer (NPV) in an edge switch. For example, an NPV edge device may be connected to a core switch, and a computing device and storage device may be positioned behind the NPV device. The computing device and the storage device may communicate with each other via the NPV edge device and the core switch. The core switch may keep a record of all computing devices that the NPV device can communicate with. Data traffic between the computing device and the storage device must traverse an uplink between the NPV device and the core switch. All switching functionality is provided by the core switch. For this reason, significant latency delays can result. For at least this reason, there is a need for improved techniques for managing data traffic flow in SAN environments.

SUMMARY

Data traffic switching among computing device in a SAN environment are disclosed herein. According to an aspect, a method may be implemented at an NPV device that is associated with multiple computing devices positioned behind the NPV device in a SAN. The method may also include receiving zoning information associated with the computing devices. The method may also include determining, based on the zoning information a map for switching data traffic among the computing devices. The map may be determined based on computing device login information and the port on which the computing device is logged into. Further, the method may include switching the data traffic among the computing devices based on the determined map.

According to another aspect, a system includes a NPV device that is associated with multiple computing devices that are behind the NPV device in the SAN. The NPV device may be configured to receive zoning information associated with the computing devices. The NPV device may also be configured to determine, based on the zoning information, a map for switching data traffic among the computing devices. The map may be determined based on computing device login information and the port on which the computing device is logged into. Further, the NPV device may be configured to switch the data traffic among the computing devices based on the determined map.

DETAILED DESCRIPTION

Figure 1:
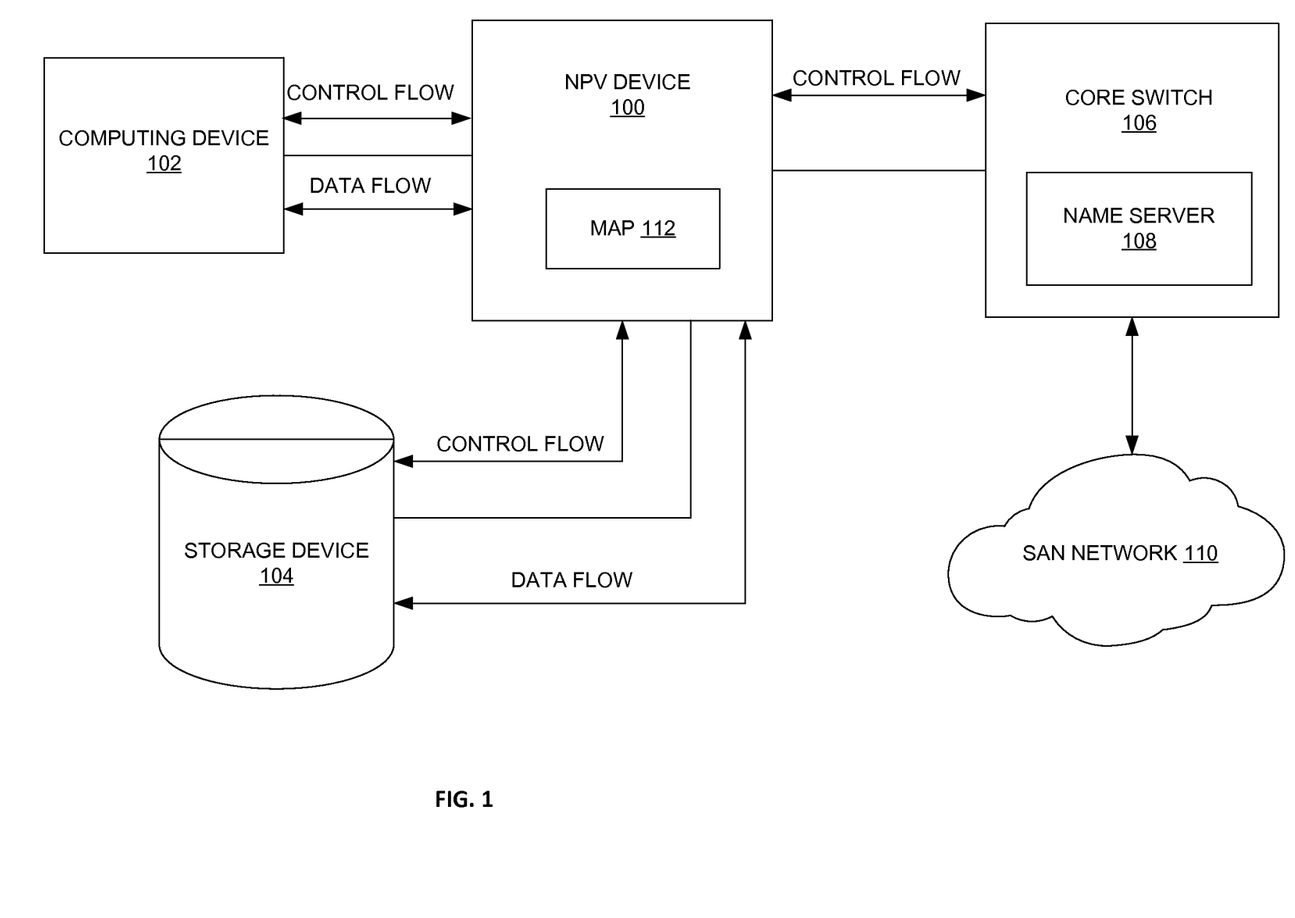
FIG. 1 is a block diagram of an example system for managing data traffic switching through an NPV device in a SAN environment in accordance with embodiments of the present invention.

FIG. 1 illustrates a block diagram of a system for managing data traffic switching through an NPV device 100 in a SAN environment in accordance with embodiments of the present invention. Referring to FIG. 1, the NPV device 100 may be communicatively connected to a computing device 102 and a storage device 104. Even though FIG. 1 only demonstrates a single computing and storage device connected to NPV edge device 100, it should be understood to those of skill in the art that several computing devices and storage devices may be connected to NPV edge device 100 for operating behind the NPV device 100 in the SAN environment. The NPV device 100 may receive data from the computing device 102 and subsequently switch the data to the storage device 104. Conversely, the NPV device 100 may receive data from the storage device 104 and subsequently switch the data to the computing device 102.

As shown in FIG. 1, the NPV device 100 is communicatively connected to another part of a SAN network 110 via a core switch 106 and serves as an edge device, or switch, in the overall SAN network. Therefore, the computing device 102 and storage device 104 may be described as being positioned behind the NPV device 100. In this example, the NPV device 100 and the core switch 106 were produced by different manufacturers, although in the alternative they can be produced by the same manufacturer. The core switch 106 can maintain, in a name server 108, a record of some or all computing devices NPV device 100 operating within the SAN environment. In an example, the computing device 102 may be any type of computer such as, but not limited to, a personal computer, a server, or the like. As an example, the storage device 104 may be considered a computing device, and may include, but is not limited to, a disk array, tape library, disk library, or the like.

In accordance with embodiments of the present invention, the computing device 102 may initiate establishment of a session with the storage device 104 for accessing data stored in storage device 104. The NPV device 100 may receive communications from the communication device 102 for the storage device 104 and switch the data communications directly to the storage device 104. Conversely, the NPV device 100 may receive communications from the storage device 104 and switch the communications directly to the computing device 102. The NPV device 100 may implement such switching by continuing to forward control traffic to the core switch 106, but directly switches the data traffic associated with a session between the computing device 102 and the storage device 104. The NPV device 100 can switch the data traffic by utilizing of a map 112 stored therein as disclosed in further detail herein.

Figure 2:
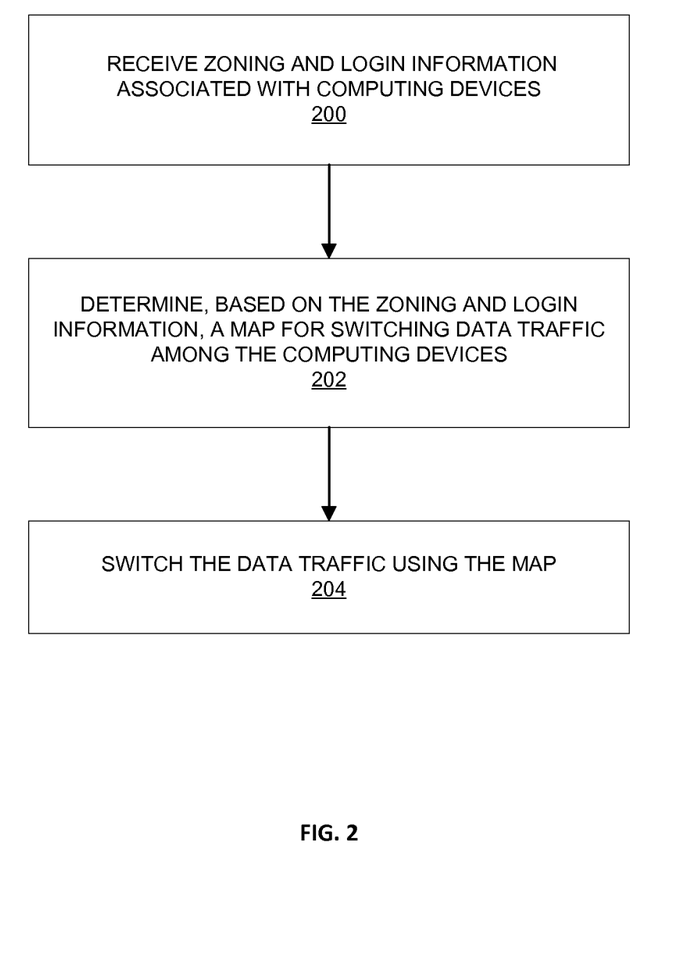
FIG. 2 is a flowchart of an example method for managing data traffic switching through an NPV device in a SAN environment based on zoning information and login information in accordance with embodiments of the present invention.

FIG. 2 is a flowchart of an example method for managing data traffic switching through an NPV device in a SAN environment based on zoning information and login information in accordance with embodiments of the present invention. In this example, the method is described as being implemented by the NPV device 100 within the SAN environment shown in FIG. 1, although it should be understood that the method may be suitably implemented in any suitable device or environment. Referring to FIG. 2, the method includes receiving 200 zoning information and login information associated with computing devices. For example, the NPV device 100 shown in FIG. 1 may receive zoning information and login information associated with computing device 102 and storage device 104.

It should be understood that zoning generally means access control. For example, the core switch 106 maintains a list of devices which can communicate with the computing device 102. In this example, the computing device 102 can communicate with the storage device 104. As an example, if computing device 102 is zoned with storage device 104, then the core switch 106 may return information identifying that computing device 102 and storage device 104 can communicate.

It should also be understood that login information generally means information identifying a device in a SAN network. For example, when computing device 102 logs onto the SAN network, the NPV device 100 may receive login information associated with computing device 102 that uniquely identifying computing device 102 in the SAN network. The login information may comprise the world wide name (WWN) associated with computing device 102. The login information may also identify which port on the NPV device 100 the computing device 102 is connected to. The login information may also comprise the fibre channel ID (FCID) assigned to the computing device 102 when the computing device 102 logs onto the SAN network.

The method of FIG. 2 includes determining 202, based on the zoning and login information, a map for switching data traffic among the computing devices. Continuing the aforementioned example, the NPV device 100 may determine, based on the zoning and login information, a map 112 used for switching data traffic associated with a session between computing device 102 and storage device 104. Further details regarding map 112 are discussed below in regards to FIG. 3.

Figure 3:
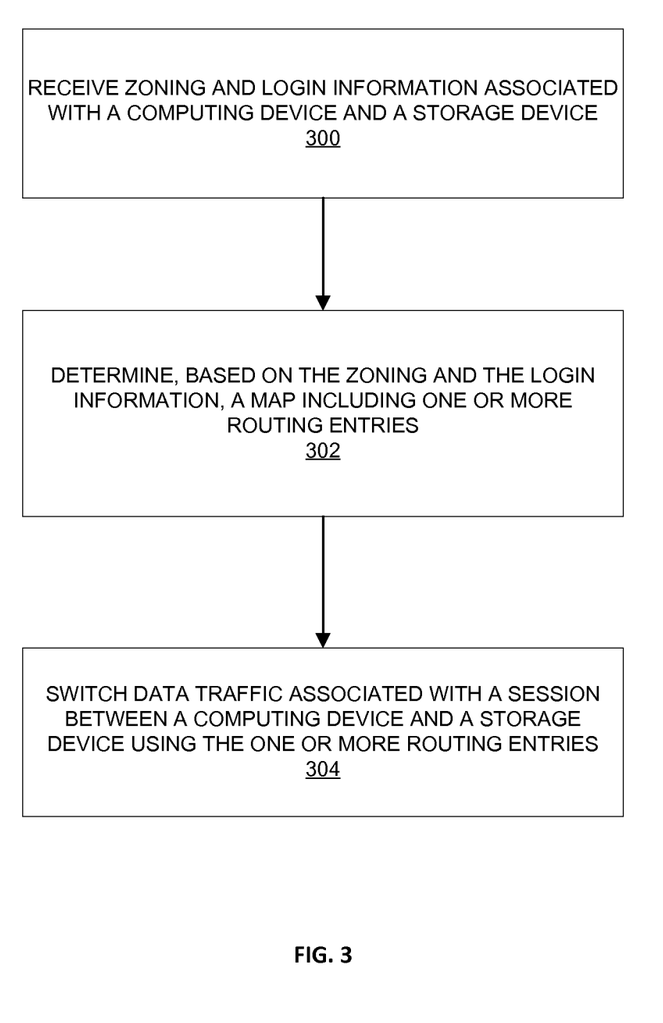
FIG. 3 is a flowchart of an example method for creating a map for switching data traffic in accordance with embodiments of the present invention.

The method of FIG. 2 includes switching 204 the data traffic using the map. Continuing the aforementioned example, subsequent to creating the map 112, the NPV device 100 may switch data traffic associated with the session between computing device 102 and storage device 104 using the map 112. Further details regarding switching data traffic utilizing map 112 are discussed below in regards to FIG. 3. The NPV device 100 may be configured to create the map 112 using zoning and login information. For example, FIG. 3 illustrates a flowchart of an example method for creating a map for switching data traffic in accordance with embodiments of the present invention. In this example, the method is described as being implemented by the NPV device 100 within the SAN environment shown in FIG. 1, although it should be understood that the method may be suitably implemented in any suitable device. Referring to FIG. 3, the method includes receiving 300 zoning and login information associated with a computing device and a storage device. For example, the NPV device 100 may receive zoning information identifying that computing device 102 and storage device 104 can communicate. For example, the zoning information may be provided to the NPV device 100 by the core switch 106.

The method of FIG. 3 includes determining 302, based on the zoning and login information, a map including one or more routing entries. A routing entry may include FCIDs of one or more computing devices, such as the computing device 102 and the storage device 104. The NPV device 100 is configured to determine one or more routing entries for the map 112 utilizing the FCIDs of the computing device 102 and the storage device 104.

Each routing entry in map 112 may have the following attributes: a source FCID (SID), a destination FCID (DID), and a destination port. Table 1 below shows an example map 112 comprising routing entries.

TABLE 1

Example of a Map for Switching Data Traffic

| SID(fig ref) | DID(fig ref) | Destination Port |
|---|---|---|
| x.y.102(102) | x.y.104(104) | 4 |
| x.y.102(102) | x.y.105(105) | 5 |
| x.y.104(104) | x.y.102(102) | 2 |
| x.y.104(104) | x.y.105(105) | 5 |
| x.y.105(105) | x.y.102(102) | 2 |
| x.y.105(105) | x.y.104(104) | 4 |

The method of FIG. 3 includes switching 304 data traffic associated with a session between a computing device and a storage device using the one or more routing entries. Continuing the aforementioned example, the NPV device 100 may switch data traffic associated with a session between the computing device 102 and the storage device 104 using a routing entry of the map 112. For example, NPV device 100 may consult map 112 when a data frame is received. The data frame may have source FCID (SID) and destination FCID (DID) fields. NPV device 100 may traverse map 112 and try to match SID and DID values with each routing entry's SID and DID value. If a matching routing entry is found, the data frame may be forwarded on the port identified in the routing entry's destination port attribute.

Figure 4:
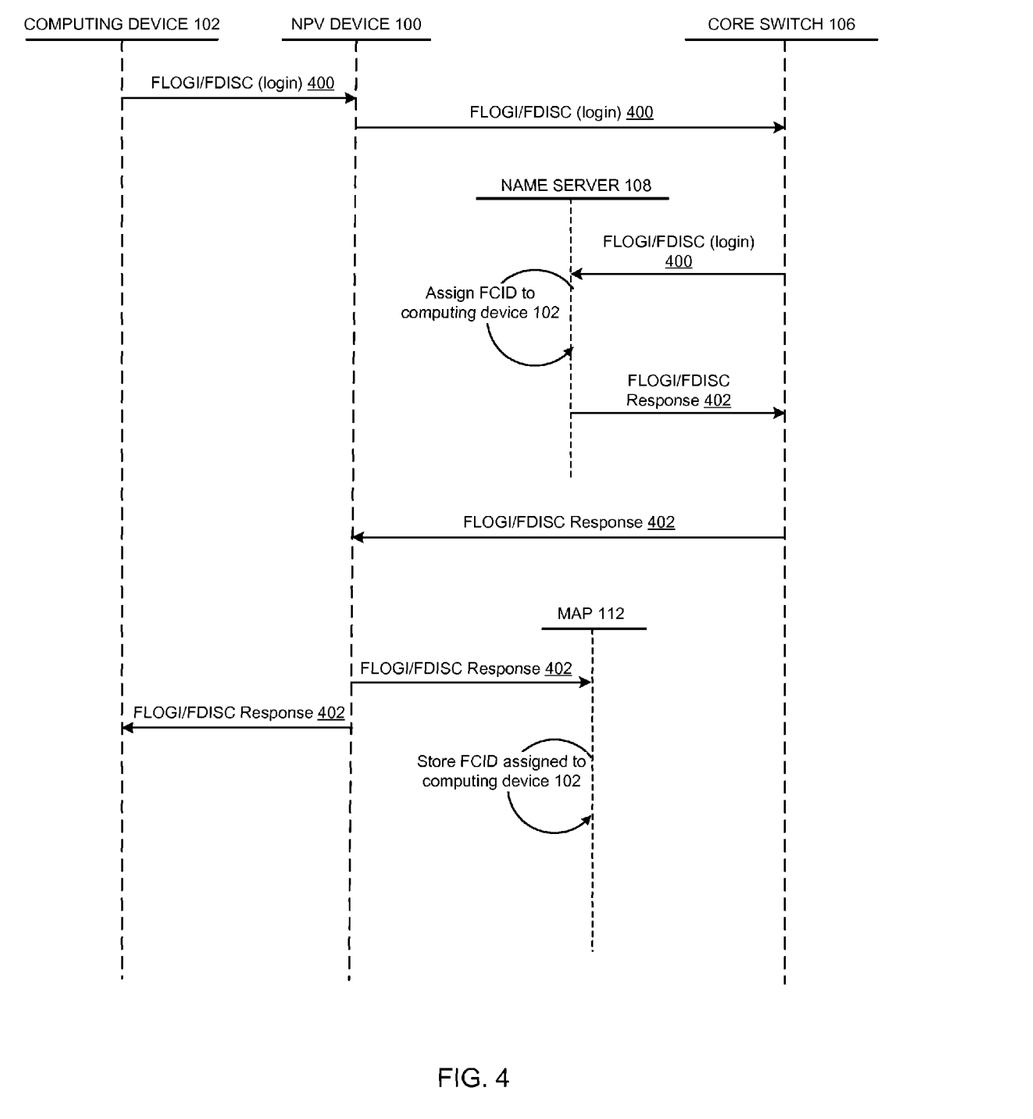
FIG. 4 is a message flow diagram of example communications between a computing device and an NPV device for building a map for switching data traffic in a SAN environment in accordance with embodiments of the present invention.

In accordance with embodiments of the present invention, the NPV device 100 may receive login information from a computing device 102. As an example, FIG. 4 is a message flow diagram of example login communications between the NPV device 100, computing device 102, and the core switch 106 in accordance with embodiments of the present invention. Referring to FIG. 4, computing device 102 sends a FLOGI/FDISC login request 400 to NPV device 100 when the computing device 102 first logs onto the SAN network. The NPV device 100 may then forward the FLOGI/FDISC login request 400 to core switch 106. NPV device 100 may forward the FLOGI/FDISC login 400 to core switch 106 to obtain a FCID for computing device 102. Once core switch 106 receives the FLOGI/FDISC login 400, the core switch 106 passes the login 400 to the name server 108 within the core switch 106 to obtain a FCID for computing device 102.

The name server 108 may then assign the computing device 102 a FCID and return a FLOGI/FDISC response 402 comprising the assigned FCID to core switch 106. Subsequently, the core switch 106 forwards the FLOGI/FDISC response 402 to NPV device 100. As discussed previously in regards to FIGS. 2 and 3, the NPV device 100 may use the login information to create a map 112 in order to switch data traffic associated with a session between computing device 102 and storage device 104. In the example provided in FIG. 4, NPV device 100 stores the FCID assigned to computing device 102 in map 112. The NPV device 100 also forwards the FLOGI/FDISC response 402 to computing device 102.

Figure 5:
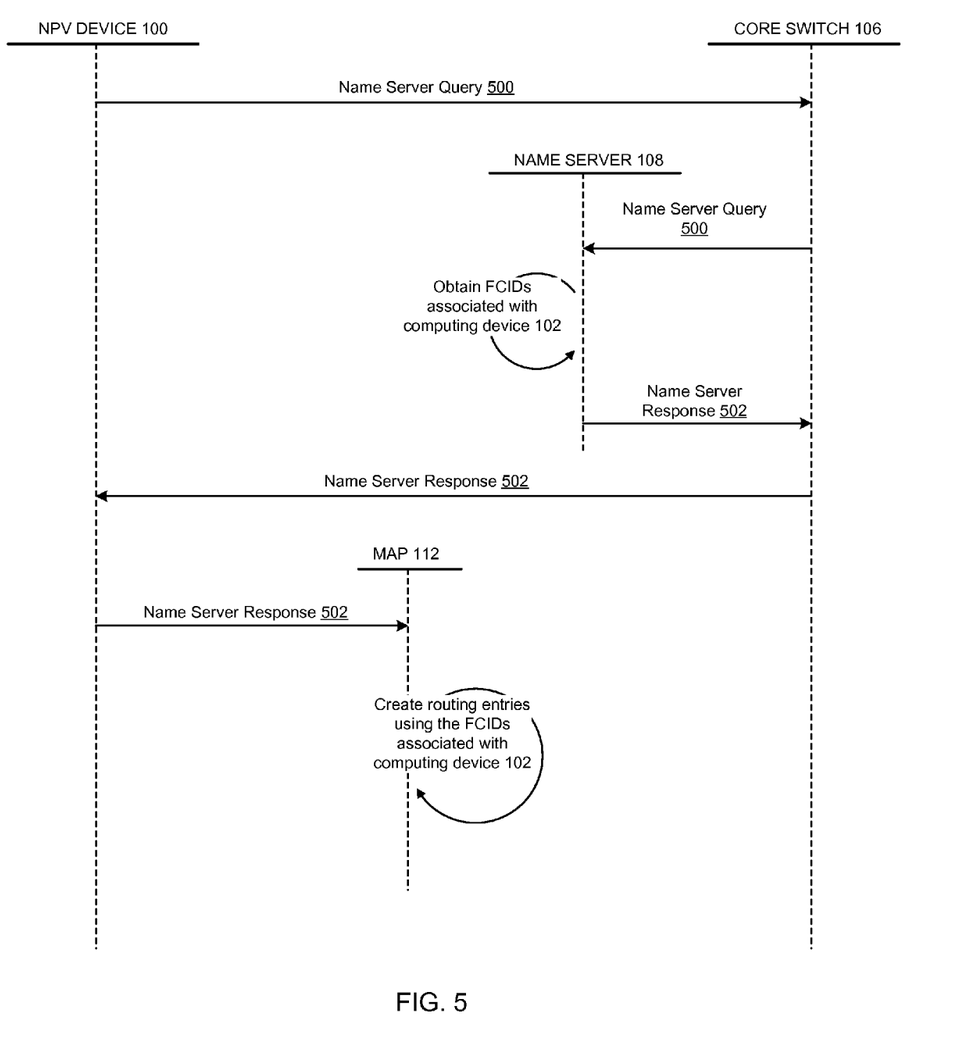
FIG. 5 is a message flow diagram of example communications for managing data traffic between an NPV device and a core switch in a SAN environment in accordance with embodiments of the present invention.

In accordance with embodiments of the present invention, the NPV device 100 may receive zoning information associated with computing device 102 by requesting the zoning information from the core switch 106. As an example, FIG. 5 is a message flow diagram of example communications between the NPV device 100 and the core switch 106 shown in FIG. 1 in accordance with embodiments of the present invention. Referring to FIG. 5, the NPV device 100 may send a name server query 500 to the core switch 106 on behalf of the computing device 102. Subsequently, the core switch 106 may interrogate the name server 108 within the core switch 106 that contains some or all of the FCIDs or WWNs of the devices and zones that the computing device 102 may communicate with. In response to the query, the NPV device 100 receives a name server response 502 from core switch 206 comprising the FCIDs or WWNs of the devices and zones that computing device 102 may communicate with. For example, the name server query response may comprise the FCID or WWN associated with storage device 104. As discussed previously regarding FIG. 2 and FIG. 3, the NPV device 100 may use the FCIDs or WWNs to create a map 112 with routing entries in order to switch data traffic associated with a session between computing device 102 and storage device 104. The presently disclosed subject matter may advantageously avoid unnecessary forwarding of data traffic associated with a session between a computing device and a storage device to a core switch.

In accordance with embodiments of the present invention, the NPV device 100 may update the map 112. As computing devices within the SAN network implements login/logout, registered state change notifications (RSCN) may be sent throughout the SAN to enable devices throughout the network to update the state of the fabric of the network. In response to receipt of an RSCN at the NPV device 100, the NPV device 100 may forward the RSCN to the computing device 102. The NPV device 100 may repeat the signal flow shown in FIG. 5 by sending another Name Server Query to the core switch 106 to obtain new FCIDs or WWNs for new computing devices in the same zone as the computing device 102 and the NPV device 100. The map stored in the NPV device may subsequently be updated with new routing entries associated with the new FCIDs or WWNs.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A system comprising:
an N-port virtualization (NPV) device configured in a storage area network (SAN) associated with a plurality of computing devices that are behind the NPV device, wherein the NPV device is configured to:
receive zoning information associated with the computing devices;
determine, based on the zoning information, a map comprising routing entries for switching data traffic among the computing devices, each routing entry identifying a destination port for each computing device of the plurality of computing devices for forwarding the data traffic to each of the computing devices; and
switch data traffic among the computing devices based on the map.

2. The system of claim 1, wherein the zoning information comprises Fibre Channel Identifications (FCIDs) associated with the computing devices.

3. The system of claim 2, wherein at least one routing entry of the routing entries is associated with at least two computing devices of the plurality of computing devices.

4. The system of claim 3, wherein the at least one routing entry comprises Fibre Channel Identifications (FCIDs) associated with the at least two computing devices.

5. The system of claim 3, wherein the at least one routing entry is associated with a session between the at least two computing devices.

6. The system of claim 1, wherein the data traffic is associated with a session between at least two computing devices of the plurality of computing devices.

7. The system of claim 1, the NPV device further configured to transmit a Name Server Query to a Name Server database to obtain the zoning information associated with the plurality of computing devices.

8. The system of claim 7, the NPV device further configured to receive a Name Server Query response comprising the zoning information from the Name Server database in response to the Name Server Query.

9. The system of claim 1, wherein the NPV device is configured to:
receive an indication the zoning information associated with the plurality of computing devices has changed;
receive updated zoning information associated with the plurality of computing devices;
update, based on the updated zoning information, the map for switching data traffic between the plurality of computing devices; and
switch the data traffic between the plurality of computing devices based on the updated map.

10. The system of claim 9, wherein the indication comprises a Registered State Notification (RCSN).

* * * * *